United States Patent
Huang et al.

(10) Patent No.: US 9,934,342 B1
(45) Date of Patent: Apr. 3, 2018

(54) CLOCK GATING VERIFICATION DURING RTL STAGE OF INTEGRATED CIRCUIT DESIGN

(71) Applicant: NXP USA, Inc., Austin, TX (US)

(72) Inventors: Song Huang, Suzhou (CN); Yifeng Liu, Suzhou (CN); Lei Ji, Suzhou (CN)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 15/374,109

(22) Filed: Dec. 9, 2016

(30) Foreign Application Priority Data

Dec. 2, 2016 (CN) .......................... 2016 1 1095503

(51) Int. Cl.
G06F 17/50 (2006.01)
(52) U.S. Cl.
CPC ................ G06F 17/504 (2013.01)
(58) Field of Classification Search
CPC .................. G06F 17/5045; G06F 2217/72
USPC ........................................ 716/100, 106, 108
See application file for complete search history.

(56) References Cited

U.S. PATENT DOCUMENTS

| | | | | |
|---|---|---|---|---|
| 6,536,024 B1* | 3/2003 | Hathaway | ................. | G06F 1/10 327/295 |
| 6,807,658 B2* | 10/2004 | Mielke et al. | ...... | G06F 17/5022 327/145 |
| 7,958,475 B2* | 6/2011 | Khan | ............... | G01R 31/31721 716/109 |
| 8,166,444 B2* | 4/2012 | Arbel et al. | ........ | G06F 17/5068 716/103 |
| 8,443,344 B1* | 5/2013 | Sundararajan et al. | ................... | G06F 17/5045 716/100 |
| 8,904,255 B2* | 12/2014 | Tekumalla et al. | ........................ | G01R 31/318594 702/117 |
| 9,280,614 B1* | 3/2016 | Sood et al. | ............. | G06F 17/50 |
| 2014/0325463 A1 | 10/2014 | Bahadra et al. | | |

OTHER PUBLICATIONS

Zhong et al., "Clock Gating Assertion Check: an Approach towards Achieving Faster Verification Closure on Clock Gating Functionality," IEEE, 6th Asia Symposium on Quality Electronic Design, 2015, 8 pages.

* cited by examiner

Primary Examiner — Sun Lin (57) ABSTRACT

Embodiments provided herein include a method for a clock gating verification during a register transfer level (RTL) circuit design stage, including: obtaining clock gating information defined in a clock gating (CG) specification according to a clock gating format, wherein the clock gating information describes a target clock gating behavior of at least a first gated clock signal utilized by an integrated circuit design, the CG specification comprises a template structure defining a relationship between an output gated clock and an input clock, based on an enable condition, and a top mapping associating top level signals, including the first gated clock signal, of the integrated circuit design to the template structure; and automatically generating a first clock gating (CG) checker to verify a clock gating behavior, based on an expected output time and an expected gated time during testing of the integrated circuit design.

20 Claims, 6 Drawing Sheets

EXAMPLE CGF FILE DESCRIPTION FOR IP_A:

```
SET UNGATED_CLOCK_LIST{\
            UNGATED_CLK1,\
            UNGATED_CLK2,\
            UNGATED_CLKN

SET GATED_CLOCK_LIST{\
            GATED_CLK1, \
            GATED_CLK2, \
            GATED_CLK3, \
            GATED_CLK4, \
            GATED_CLKN

SET_SUB_MODULE            CG_MODULEA
SET_CLOCK_GATING -NAME CG{\
            SET_CKB          CLK_IN \
            SET_ENABLE       CG_ENABLE \
            SET_GCKB         GCLK_OUT \
            SET_ON_CYCLE     ON_CYCLE \
            SET_OFF_CYCLE    OFF_CYCLE }
END_SUB_MODULE
```

FIG. 6

EXAMPLE CGF INSTANCE FILE FOR CG_MODULEA

```
SET_INSTANCE   GATED_CLK1_CONDITION
               -MODULE CG_MODULEA
               -SIGNAL_MAPPING {\
               {CLK_IN        IP_A, UNGATED_CLK1}\
               {CG_ENABLE     IP_A, CLK1_ENABLE}\
               {GCLK_OUT      IP_A, GATED_CLK1}\
               {ON_CYCLE      2*SAMPLE_CLK}\
               {OFF_CYCLE     2*SAMPLE_CLK}\
               }
```

ASSERTION CHECK EXAMPLE: GATED_CLK1_CONDITION

PROPERTY GATED_CLK1_ENABLE:
@(POSEDGE SAMPLE_CLK) ((CLK1_ENABLE==1) && $ROSE(UNGATED_CLK1)) |-> ##2 GATED_CLK1 == UNGATED_CLK1;
ENDPROPERTY
PROPERTY GATED_CLK1_DISABLE:
@(POSEDGE SAMPLE_CLK) ((CLK1_ENABLE==0) && $ROSE(UNGATED_CLK1)) |-> ##2 GATED_CLK1 == 0;
ENDPROPERTY
FIRST_CG_CHECK: ASSERT PROPERTY (GATED_CLK1_ENABLE);
SECOND_CG_CHECK: ASSERT PROPERTY (GATED_CLK1_DISABLE);

FIG. 9

CLOCK GATING VERIFICATION DURING RTL STAGE OF INTEGRATED CIRCUIT DESIGN

BACKGROUND

Field

This disclosure relates generally to clock gating analysis, and more specifically, to clock gating verification of an integrated circuit design.

Related Art

Modern digital integrated circuit (IC) designs are often required to provide high speed operation while also having low power consumption. In order to provide such opposing requirements, techniques such as clock gating are implemented to reduce the dynamic power consumption of a digital IC device. Clock gating adds logic components to a synchronous circuit of the IC design to "prune" the clock tree. Such pruning disables the redundant hardware toggling of various circuitry, such as the circuit clock tree, hardware registers, and other clock dependent devices. When not being toggled or switched, the dynamic power consumption of the disabled hardware goes to zero and only leakage currents are incurred.

Register transfer level (RTL) is a design abstraction that models a synchronous digital IC design in terms of the flow of digital signals (e.g., data) between hardware registers and the logical operations performed on those signals. RTL abstraction is used in hardware description languages (HDLs) to create high-level representations of an IC, from which lower-level representations (such as transistor-level or gate-level representations) and ultimately actual silicon can be derived. Design at the RTL stage is conventional practice in modern digital IC design. A synchronous random circuit includes two kinds of elements: registers and combinational logic. Registers (e.g., implemented as D-type flip flops) synchronize operation of a circuit to edges of a clock signal and are the only elements in the circuit that have memory properties. Combinational logic performs all the logical functions in the circuit and typically only includes logic gates (e.g., AND gates, NAND gates, OR gates, NOR gates, etc.). In HDL, a designer declares the registers and describes the combinational logic by using constructs (e.g., if-then-else statements and arithmetic operations) that are familiar in programming languages. In general, RTL focuses on describing the flow of signals between registers.

BRIEF DESCRIPTION OF THE DRAWINGS

The present invention may be better understood, and its numerous objects, features, and advantages made apparent to those skilled in the art by referencing the accompanying drawings.

The present invention is illustrated by way of example and is not limited by the accompanying figures, in which like references indicate similar elements, unless otherwise noted. Elements in the figures are illustrated for simplicity and clarity and have not necessarily been drawn to scale.

DETAILED DESCRIPTION

The following sets forth a detailed description of various embodiments intended to be illustrative of the invention and should not be taken to be limiting.

Overview

The present disclosure includes a clock gating format (CGF) that provides a template structure (also referred to as a clock gating (CG) module) and a signal map (also referred to as a top CGF mapping) to represent a clock gating (CG) specification designed to implement a low power architecture for an integrated circuit (IC) design. The CG specification describes the target clock gating behavior for one or more gated clock signals utilized in the IC design. The CG module models a golden clock gating relationship (e.g., a defined ideal model) between an input clock and an output clock, based on an enable condition. The output clock is based on the input clock, where an activated enable condition (e.g., the enable condition carries a logic level one or asserted signal) indicates the output clock is outputted (e.g., the input clock is output as the output clock) and a deactivated enable condition (e.g., the enable condition carries a logic level zero or cleared signal) indicates the output clock is gated or stopped (e.g., a ground signal is output as the output clock).

The top CGF mapping associates the model attributes defined in the CG module with top level signals in the IC design. For example, a first gated clock signal utilized in the IC design is associated with the output clock of the CG module, a first ungated clock signal utilized in the IC design is associated with the input clock of the CG module, and an enable signal utilized in the IC design is associated with the enable condition of the CG module. The CG module and top CGF mapping together define clock gating information that describes the target clock gating behavior for the first gated clock signal.

In some embodiments, the model attributes also include an on-cycle time that indicates when the output clock is expected to be outputted after the enable condition is activated, and an off-cycle time that indicates when the output clock is expected to be gated or stopped after the enable condition is deactivated. The on-cycle time and off-cycle time are each defined as an amount of time or number of clock cycles in the top CGF mapping. In some embodiments, the clock gating format defines the various syntax structures, model attribute types, and mapping associations that implement the CG module and top CGF mapping in hardware description language (HDL) code.

During register-transfer-level (RTL) testing of the IC design, the CG specification, which includes one or more CG modules and the top CGF mapping, is provided to CGF checker logic, which automatically generates one or more CG checkers for the one or more gated clock signals being verified. The CG checkers include property assertion checks that are automatically generated based on the clock gating information defined in the CG specification. CGF checker logic provides the one or more CG checkers to an RTL simulator or to a separate property checker tool, which incorporates the CG checkers into the test environment in which the IC design is tested. During testing (which may be formal verification or dynamic simulation), the CG checkers verify whether the one or more gated clock signals behave in a manner consistent with the target clock gating behavior described in the CG specification. If any of the one or more gated clock signals behave in an inconsistent (e.g., non-ideal or non-target) manner, a respective one of the one or more CG checkers indicates that a failure has occurred. IC designers may then correct the cause of the failure, such as by revising the IC design, the CG specification, or both, while remaining in the RTL design stage.

Example Embodiments

Figure 1:
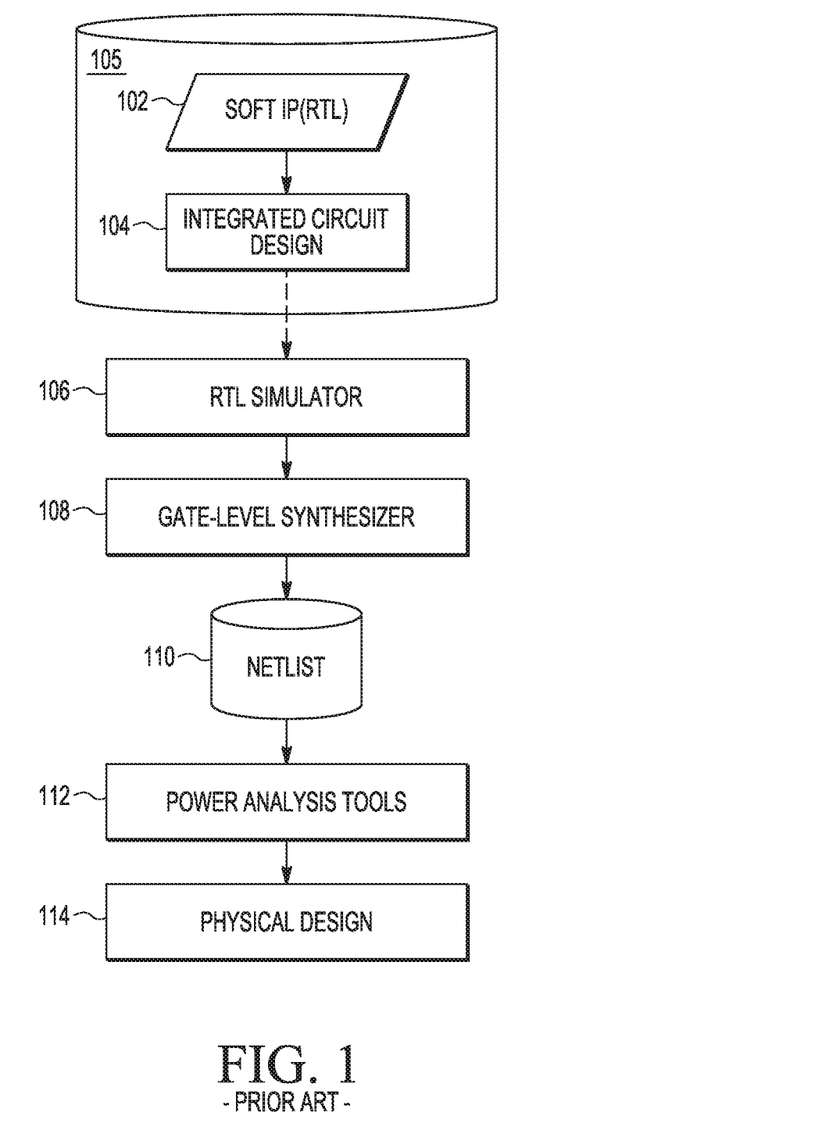
FIG. 1 illustrates a prior art integrated circuit design flow.

When designing a new integrated circuit (IC), the design flow like that illustrated in FIG. 1 often begins with a system-level design that describes the overall functionality of the IC. During a register-transfer-level (RTL) design stage of the design flow, different aspects of the IC's functionality are represented by a number of functional models defined in hardware description language (HDL) code, examples of which include Verilog and VHDL (VHSIC HDL or Very High Speed Integrated Circuit HDL). IC designers may choose to implement one or more of the functional models as one or more soft IP (Intellectual Property) blocks 102, which are entirely modifiable by the IC designers in the RTL design stage. Soft IP 102 is often source code produced by the IC designers during the RTL design stage. The soft IP blocks 102 are incorporated into an integrated circuit (IC) design 104, which includes the HDL code of all functional models representing the functionality of the IC being designed. The IC designers may also choose to implement one or more of the functional models as one or more hard IP blocks that provide one or more pre-defined functional models, which are not modifiable by the IC designers at the RTL stage, and are often obtained from third-party vendors. The soft IP 102 and IC design 104 are stored as RTL data 105 (e.g., as a number of files in a storage device or memory).

The IC design 104 is then verified using an RTL simulator 106, which is configured to simulate the IC design 104 to reproduce behavior of the IC design 104. The IC design 104 is simulated in a test environment defined by a test bench, which implements certain parameters for the IC design simulation, as specified by the IC designers. RTL simulator 106 is configured to run multiple test simulations on the IC design 104 to capture inter-register signals produced by the IC design 104, which are used to verify whether the IC design is functioning as expected.

Once the IC design 104 is verified in the RTL stage, the design flow continues to a circuit design stage, where a gate-level synthesizer 108 uses the RTL data 105 (such as the soft IP 102 and IC design 104) to generate a gate-level netlist 110 for the IC design 104. The netlist 110 describes the logic components of the IC design and their connections. Gate-level synthesizer 108 may also generate timing information in standard delay format (SDF), which includes timing information such as path delays, interconnect delays, and skew timing constraints. As part of the circuit design stage, IC designers may use an electronic design automation (EDA) tool to perform power analysis on the synthesis results for the IC design 104, such as whether the netlist 110 is suitable for achieving a high operating frequency, lower power consumption, small silicon area, and the like.

Once the power analysis is complete, the design flow continues to a physical design stage 114, where the netlist 110 is used create an IC layout or blueprint that maps out geometric representations of all IC components, such as capacitors, resistors, logic gates, and transistors that will be formed as part of the IC in silicon. The IC layout is then used to fabricate the IC in silicon.

As integrated circuit (IC) designs become more complex, achieving low power in such designs becomes more challenging. Many low power technologies are used in integrated circuit designs, such as clock gating, power gating, multi-power domains, and the like. Many EDA power analysis tools are popular, but such tools often require the compiled gate-level netlist and SDF timing information that are obtained during the circuit design stage to perform power analysis. Clock gating verification using such tools during the circuit design stage requires the IC design flow to return to the earlier register-transfer-level (RTL) design stage to correct any errors found during circuit design stage verification and to repeat the circuit design stage, including re-compilation of the netlist and timing information and re-running verification. Such an approach is often repetitive in order to catch the various errors that may not be revealed until other errors are caught, which is expensive in both time and cost (e.g, delays the overall product-to-market timeline).

Figure 2:
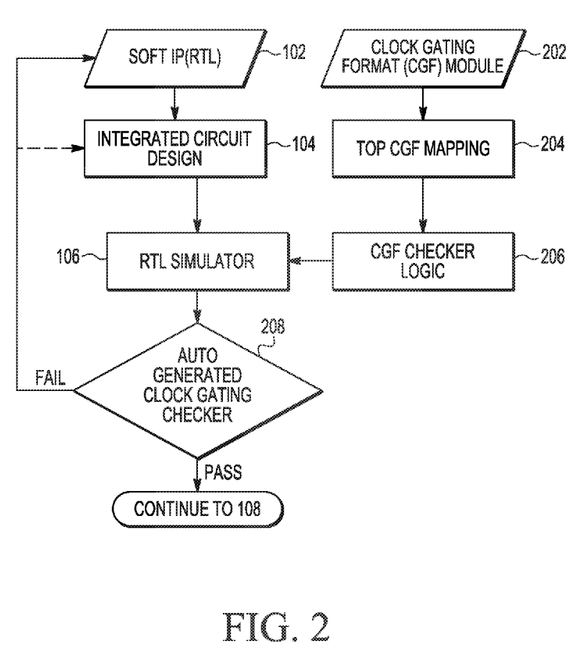
FIG. 2 illustrates an example integrated circuit design flow in which the present disclosure is implemented, according to some embodiments.

The present disclosure provides a modified IC design flow, aspects of which are shown in FIG. 2, which provides clock gating verification during the RTL design stage, without requiring the netlist 110 or SDF timing information to be compiled. The modified IC design flow provided by the present disclosure avoids any expensive delays that would occur due to repeated discovery of errors late in the circuit design stage.

As noted above, IC designers may implement one or more of the functional models of the IC being designed as soft IP 102, which are incorporated into IC design 104 that includes all functional models of the IC being designed. Also during the RTL design stage, IC designers define a clock gating (CG) specification for the IC design 104 using the clock gating format. In some embodiments, the CG specification is designed to implement a low power architecture for the IC design 104, where some clocks in the IC design 104 are gated at various times to save power. The clock gating format provides two structures to define a CG specification: a template structure, also referred to as a clock gating format (CGF) module 202, and a mapping structure, also referred to as a top CGF mapping 204.

As a template structure, a CGF module functions as a defined ideal model or representation of an ideal clock gating circuit that generates a gated output clock based on an ungated input clock and an enable condition. The enable condition indicates when the output clock is activated (e.g., when the ideal clock gating circuit passes the input clock as the output clock) and when the output clock is deactivated (e.g., when the ideal clock gating circuit outputs a cleared signal as the output clock). The output clock, the input clock, and the enable condition are model attributes of the CGF module, where the relationship between these model attributes is also referred to as a golden clock gating relationship.

In other words, a CGF module models a golden clock gating relationship between an ungated input clock and a gated output clock, based on an enable condition. It is noted that the golden clock gating relationship is a conceptual relationship that does not require implementation of detailed logic (e.g., the ideal clock gating circuit is not implemented as an actual clock gating circuit in HDL code of the IC design 104), since the target clock gating behavior of the gated output clock is described in the CG specification, as further discussed below.

A top CGF mapping 204 defines associations between the model attributes of the CGF module 202 with top level signals implemented in the IC design 104. For example, the input clock of the CGF module is associated with or mapped to an ungated clock signal in the IC design 104, the output clock of the CG module is associated with or mapped to a gated clock signal in the IC design 104, and the enable condition of the CG module is associated with or mapped to an enable signal in the IC design 104. In other words, the top CGF mapping 204 associates a CGF module with a particular gated clock signal utilized in the IC design 104. Together, the CGF module 202 and the top CGF mapping 204 describe target clock gating behavior (via the golden clock gating relationship) for the particular gated clock signal utilized in the IC design 104. Additional model attributes may also be defined to further tailor the target clock gating behavior, such as an on-cycle time and an off-cycle time as discussed below. In some embodiments, the gated clock signal is utilized in a soft IP block 102 that is incorporated in the IC design 104.

The CG specification may include one or more instances of the CGF module, where each CGF module instance may be associated with a different gated clock signal utilized in the IC design, as mapped in the top CGF mapping 204. As such, each CGF module instance models the golden clock gating relationship for that particular gated clock signal, the ungated clock signal, and the enable condition signal on which generation of the gated clock signal is based. The one or more CGF modules 202 and the top CGF mapping 204 are also referred to as CGF data.

The CGF data is provided to CGF checker logic 206, which is configured to recognize the clock gating format and automatically generate a clock gating (CG) checker for each of the one or more gated clock signals of the IC design whose target clock gating behavior is described in the CGF data and needs to be verified. CGF checker logic 206 is configured to identify model attributes defined in each CGF module and identify the top level signals mapped to those attributes, based on the top CGF mapping. CGF checker logic 206 then generates a CG checker 208 for a particular gated clock signal by automatically generating property assertions, each of which is a statement or defined property that is asserted to be true. The property assertions define criteria and behavior sequences that represent the target behavior of the gated clock signals of the CG specification for the IC design, based on the attributes and mapped top level signals identified in the CGF data.

CGF checker logic 206 also automatically generates assertion checks, which verify whether the property assertions hold true during testing (either by dynamic simulation or by formal verification). Property assertions can be checked by the assertion checks either dynamically by simulation (e.g., in cooperation with RTL simulator 106), or statistically by a separate property checker tool (which may also be in cooperation with RTL simulator 106), such as a formal verification tool that proves whether or not the tested clock gating behavior of a gated clock signal matches the expected target behavior described in the CG specification. The assertion checks and the property assertions, also referred to as CG checkers 208, are provided to the RTL simulator 106 in some embodiments, or to a separate property checker tool in other embodiments.

In the embodiment shown in FIG. 2, RTL simulator 106 also obtains the RTL data 105 (which includes the soft IP 102 and IC design 104) and simulates the IC design in a test environment. In embodiments where a separate property checker tool is used, the tool obtains the RTL data 105 to test the IC design. During testing of the IC design 104 (which may be either dynamic simulation or formal verification), the CG checkers 208 verify whether the one or more gated clocks behave in a manner consistent with the ideal behavior defined in the CGF data (i.e., the target behavior described in the CG specification).

If a gated clock associated with a property assertion is behaving in a non-ideal manner during testing, the tested behavior of the gated clock violates the property assertion (e.g., the property assertion is determined to be false) and its associated CG checker 208 indicates a failure. The CG checker may provide a flag to indicate that an error has occurred or otherwise identify the failure. The IC designers may then return to the RTL data (such as the soft IP 102 or optionally the IC design 104) and correct the cause of the failure while remaining in the RTL design stage, without having to repeat the circuit design stage. Once clock gating verification, RTL stage verification, or both, is complete, the design flow may continue to the circuit design stage as shown in FIG. 1 (e.g., gate-level synthesis).

Figure 3:
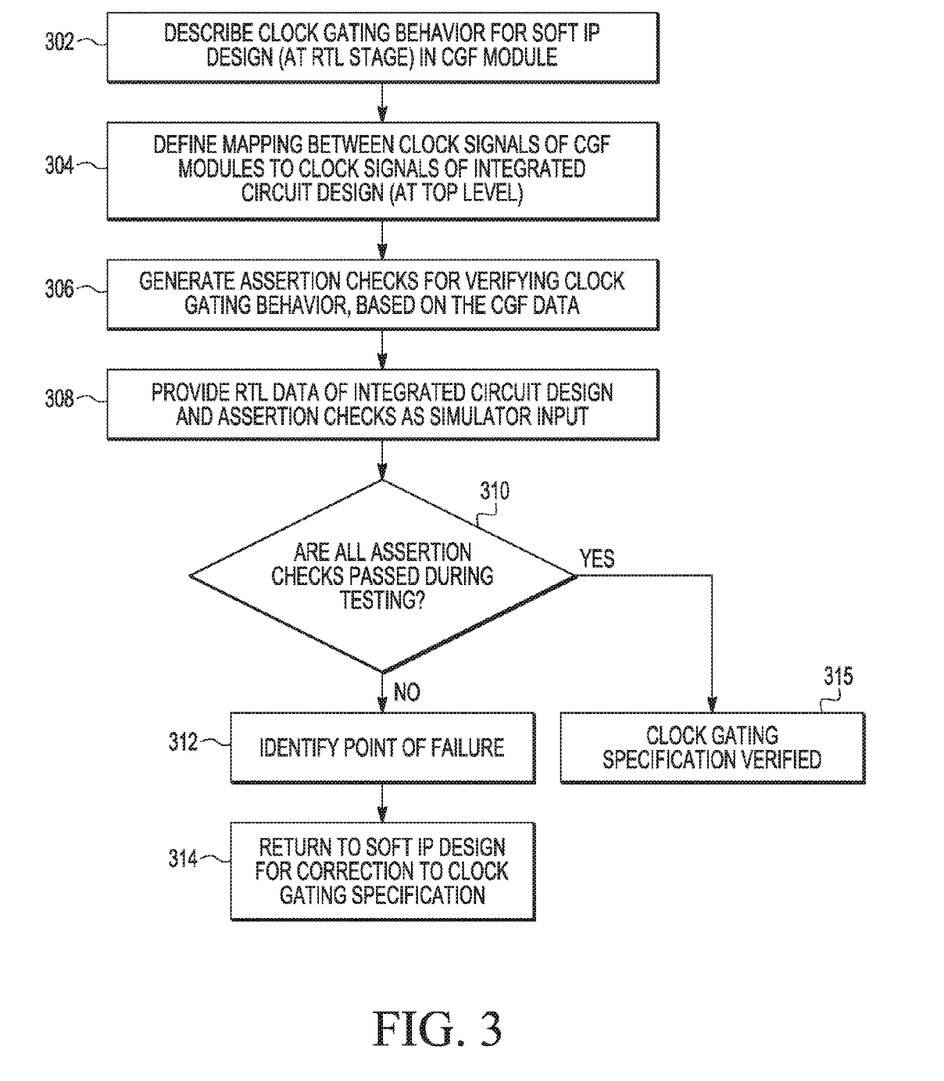
FIG. 3 illustrates a flowchart depicting an example clock gating verification process in which the present disclosure is implemented, according to some embodiments.

FIG. 3 illustrates a flowchart depicting an example clock gating verification process, which may be implemented, in part, by CGF checker logic 206 that is configured to recognize the clock gating format described herein. As discussed above, an IC designer describes functionality of the IC design in soft IP 102 during the RTL design stage. Also during the RTL design stage, the IC designer describes the target clock gating behavior of a clock gating (CG) specification designed for the IC design 104, which is shown in two steps as operations 302 and 304. In some embodiments, the CG specification is designed to implement a low power architecture in the soft IP 102 of IC design 104. An example of a CG specification is discussed below in connection with FIG. 4.

In operation 302, IC designers define one or more instances of CGF module 202 that model the golden clock gating relationship, where each instance of CGF module 202 includes a set of model attributes (such as an input clock, an output clock, and an enable condition). An example of a CG module is discussed below in connection with FIG. 5.

In operation 304, IC designers define a top CGF mapping that maps or associates model attributes described in each CGF module instance (such as an input clock, an output clock, and an enable condition) with top-level signals utilized in the IC design 104. Each instance of CGF module 202 is associated with a gated clock signal utilized in the IC design 104, such as in soft IP 102. An example top CGF mapping is discussed below in connection with FIG. 6.

In operation 306, CGF checker logic 206 is configured to automatically generate assertion checks or CG checkers 208 to verify clock gating behavior of the gated clock signals associated with the CGF module instance, where the CG checkers 208 are based on the clock gating information defined in CGF data that includes both the instances of CGF modules and the top CGF mapping. CGF checker logic 206 is configured to identify attributes defined in the CGF module instances and the mapped signals associated with those attributes, automatically generate property assertions that incorporate the attributes and mapped signals into criteria and behavior sequences that represent the target behavior of the gated clock signals utilized in the IC design 104 that need verification, and automatically generate assertion checks or the CG checkers 208 that verify those property assertions. Examples of the property assertions and assertion checks are discussed below in connection with FIG. 8.

In operation 308, RTL data 105 of the IC design 104, including the soft IP 102, and the assertion checks or CG checkers 208 are provided as input to RTL simulator 106. The CG checkers 208 are incorporated into the test environment in which the IC design 104 is simulated and tested. During testing of the IC design 104, such as during RTL verification (or formal verification) or during one or more dynamic simulations, the assertion checks indicate whether the tested behavior of the gated clock signals match the target behavior described in the property assertions based on the CG specification (which includes the CGF module instances the top CGF mapping), which is shown as operation 310.

If at least one of the assertion checks or CG checker detects a failure (e.g., detects that the tested behavior of the gated clock signal violates the property assertion), then the failed assertion check flags or otherwise identifies a point of failure, shown as operation 312. The IC designer can use the assertion check failures to identify areas in the IC design 104, such as in the soft IP 102, or in the CG specification, that need to be corrected, shown as operation 314. Returning to operation 310, if all assertion checks are passed, then the CG specification is successfully verified, as shown in operation 315. Waveforms illustrating example tested behavior of top-level signals implemented in an IC design 104 are discussed below in connection with FIG. 7.

Figure 4:
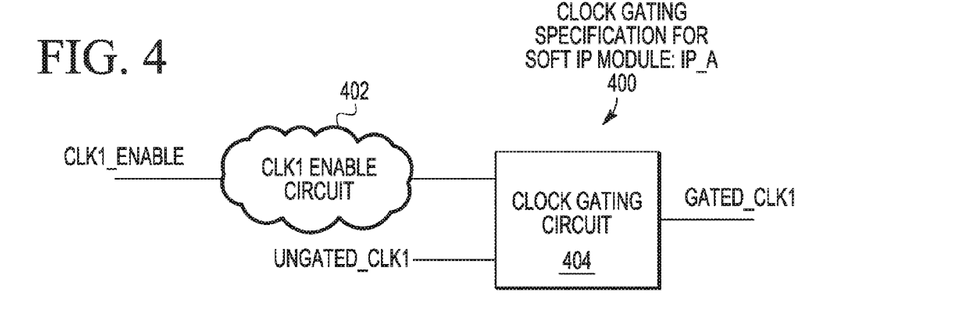
FIG. 4 illustrates a block diagram depicting an example clock gating specification for a soft IP (Intellectual Property) module of an integrated circuit design, according to some embodiments.

FIG. 4 illustrates an example clock gating (CG) specification 400 for a soft IP module named IP_A that is included in soft IP 102, which shows an example of an ideal clock gating circuit 404 that is represented by a CGF module. The CGF module models the conceptual relationship between input and output clocks of the clock gating circuit 404, which are associated with top-level IC design clock signals UNGATED_CLK1 as the input clock and GATED_CLK1 as the output clock. CLK1_ENABLE is also associated as the enable condition, which is provided to clock gating circuit 404 by enable logic represented by an enable circuit 402.

Clock gating circuit 404 provides the output clock (or GATED_CLK1) based on the logic level state of the enable condition (or CLK1_ENABLE) and the input clock (or UNGATED_CLK1). For example, the input clock is provided (or passed) by clock gating circuit 404 as the output clock in response to the enable condition being activated or asserted (e.g., the enable condition carries a logic level one). The output of clock gating circuit 404 is cleared (e.g., a logic level zero signal or ground is output) in response to the enable condition being deactivated or cleared (e.g., the enable condition carries a logic level zero). The clock gating format defines this baseline or target behavior into each CGF module as the golden clock gating relationship, where the model attributes of the CGF module are used to associate this baseline or target behavior with a particular output gated clock used in the soft IP 102 (such as GATED_CLK1), based on a particular ungated input clock (such as UNGATED_CLK1) and a particular enable condition (CLK1_ENABLE) that are also present in the soft IP 102.

In other embodiments, additional model attributes may also be included in the CGF module's set of attributes to further augment the baseline or target behavior represented by the CGF module. For example, an on-cycle time attribute may be included, which indicates when the output clock (or GATED_CLK1) is output after the enable condition (or CLK1_ENABLE) is activated. Similarly, an off-cycle time attribute may be included, which indicates when the output clock (or GATED_CLK1) is gated or stopped after the enable condition (or CLK1_ENABLE) is cleared. The on-cycle and off-cycle times are used to account for the propagation delay that may occur during clock gating. For example, the output clock may be expected to be output by clock gating circuit 404 that includes at least one flip flop that is clocked by a sample clock signal in the testing environment, whose output is delayed by a number of clock cycles relative to its input. In such an example, the output clock (GATED_CLK1) may be output at some amount of time (such as a number of clock cycles of the sample clock signal) after the enable condition (CLK1_ENABLE) is activated. In embodiments where the flip flop is triggered on rising edges of the sample clock signal, the output clock is output at some time after both the enable condition is activated and a rising edge of input clock (UNGATED_CLK1) has occurred.

It is noted that the specific structure of a clock gating circuit need not be known during the RTL design stage, since the clock gating format provides the on-cycle and off-cycle times as a way to further describe the target behavior of the gated clock produced by such a clock gating circuit, without requiring specific detailed logic to do so. It is also noted that the on-cycle and off-cycle times may be the same number of clock cycles or amount of time in some embodiments, or may each be a different number of clock cycles or amount of time in other embodiments.

Figure 5:
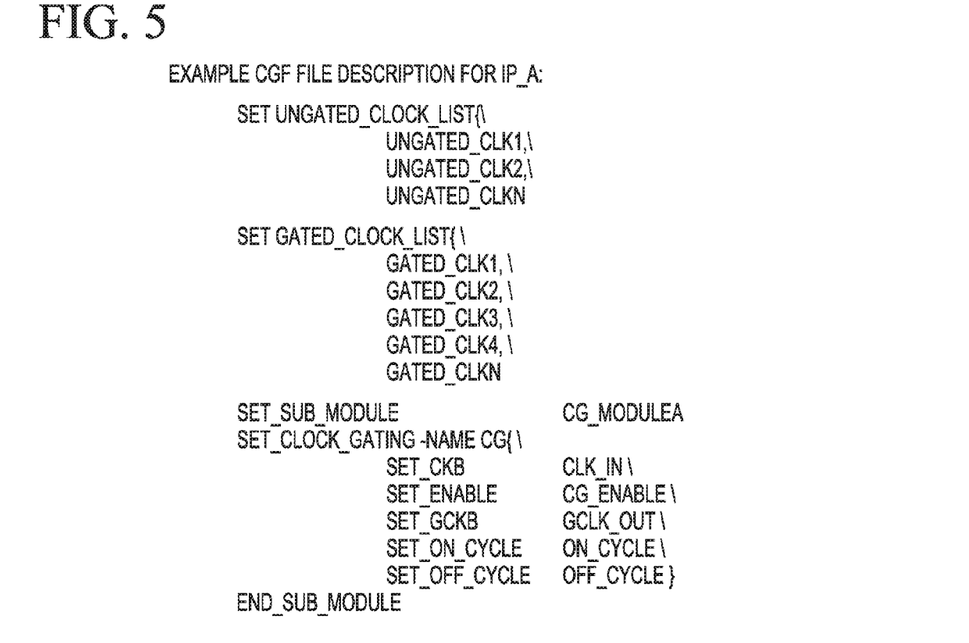
FIGS. 5 and 6 illustrate example clock gating format (CGF) files that describe the clock gating specification for the soft IP module, according to some embodiments.

FIG. 5 illustrates an example clock gating format (CGF) file description that defines part of the CG specification 400 for the soft IP module IP_A. The CGF file includes a list of ungated clock signals that are utilized in the soft IP module IP_A, which is illustrated as UNGATED_CLOCK_LIST. The ungated clock list includes the signal names of an N number of ungated clock signals, which is three in the example shown: UNGATED_CLK1 (which is shown in FIG. 4), UNGATED_CLK2, and UNGATED_CLKN. It is noted that the ungated clock signals do not have associated clock gating information described in the CG specification 400.

The CGF file description also includes a list of gated clock signals that are also utilized in the soft IP module IP_A, which is illustrated as GATED_CLOCK_LIST. The gated clock list includes the signals names of an N number of gated clock signals, which is five in the example shown: GATED_CLK1 (which is shown in FIG. 4), GATED_CLK2, GATED_CLK3, GATED_CLK4, and GATED_CLKN. As used herein, it is noted that N is an integer representing some number, where the N number of ungated clock signals are not equal to the N number of gated clock signals in some embodiments, while the N number may be the same for both ungated and gated clock signals in other embodiments. It is noted that the gated clock signals have associated clock gating information that is described in the CG specification 400.

The CGF file description also includes a CGF module definition, named CG_MODULEA, which in turn defines a set of model attributes: an input clock attribute named CLK_IN, an enable condition attribute named CG_ENABLE, and an output clock attribute named GCLK_OUT. The example shown in FIG. 5 also includes an on-cycle time named ON_CYCLE and an off-cycle time named OFF_CYCLE. Each attribute is defined based on a respective attribute type defined by the clock gating format. For example, the clock gating format uses "CKB" to indicate the input clock attribute type, "ENABLE" to indicate the enable condition attribute type, "GCKB" to indicate the output clock attribute type, "ON_CYCLE" to indicate the on-cycle time attribute type, and "OFF_CYCLE" to indicate the off-cycle time attribute time. While a single CGF module is shown in FIG. 5 (as CG_MODULEA), other embodiments may include multiple CGF modules (such as CG_MODULEB being defined for another soft IP module IP_B).

Figure 6:
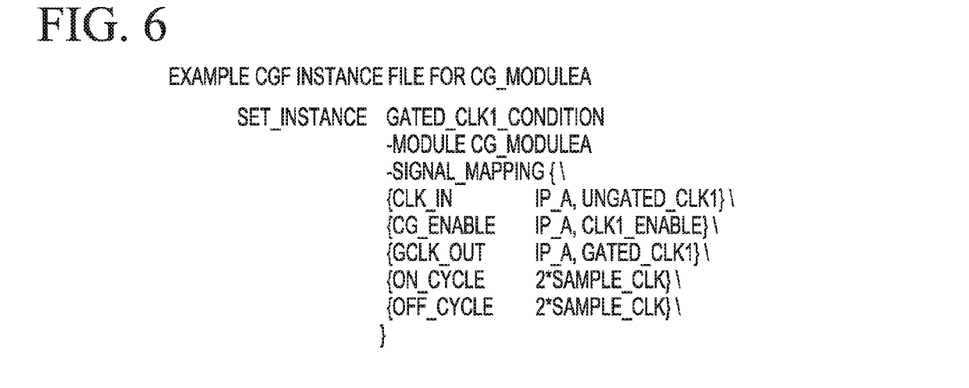

FIG. 6 illustrates an example CGF instance file that instantiates the CGF module definition CG_MODULEA and includes a top CGF mapping, shown as SIGNAL_MAPPING, that is associated with CG_MODULEA. The top CGF mapping associates the top-level ungated and gated clock signals utilized in the IC design 104 with the model attributes defined in the associated CGF module. Each attribute name defined in the CGF module instance is associated with a signal name defined in the RTL data of the IC design 104. For example, the signal mapping associates the following:

CLK_IN of CG_MODULEA with UNGATED_CLK1 of IP_A,
CG_ENABLE of CG_MODULEA with CLK1_ENABLE of IP_A, and
GCLK_OUT of CG_MODULESA with GATED_CLK1 of IP_A.

The signal mapping also defines values for the ON_CYCLE and OFF_CYCLE times as 2 clock cycles of the sample clock that is used to test the IC design 104.

Figure 8:
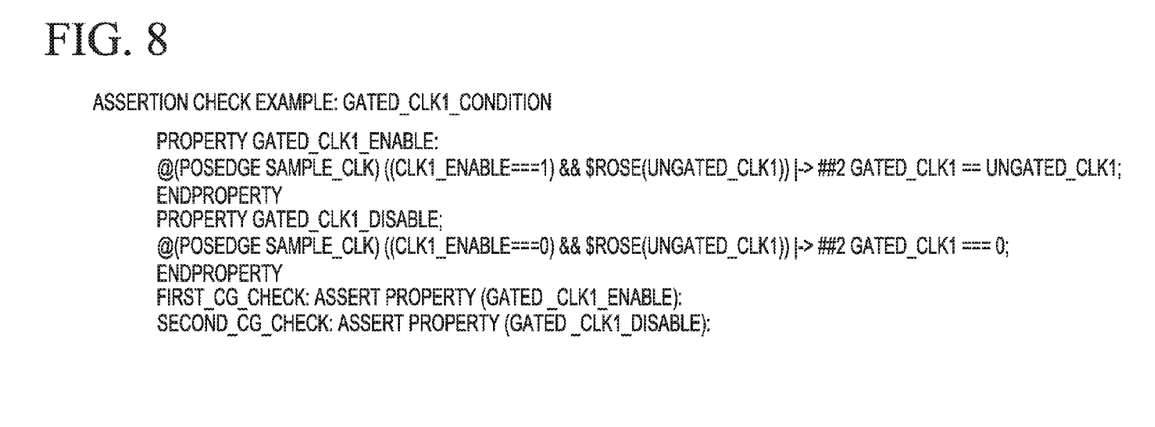
FIG. 8 illustrates an example clock gating checker, according to some embodiments.

FIG. 8 illustrates example assertion checks or CG checkers that are automatically generated by the CGF checker logic 206, based on the CGF data that includes clock gating information defined in both the CGF modules shown in FIG. 5 and the top CGF mapping shown in FIG. 6. A CG checker is generated for each gated clock signal utilized in the IC design and included in the CG specification 400. A CG checker includes a pair of property assertions: an enable property assertion (named GATED_CLK1_ENABLE) and a disable property assertion (named GATED_CLK1_DISABLE).

An enable property assertion includes enable criteria that indicates the input clock (UNGATED_CLK1) is outputted or passed as the output clock (GATED_CLK1) based on, at least in part, a first state (e.g., an activated or asserted state, such as logic level one) of the enable condition (CLK1_ENABLE), and a behavior sequence that describes the target behavior of the output clock (GATED_CLK1) that is expected during testing of the IC design. In some embodiments, a structure of the enable property assertion may be defined as (Enable Criteria)|→(Behavior Sequence), where the |→ symbol indicates the behavior sequence is evaluated in response to the enable criteria being satisfied.

An initial version of the enable property assertion may use the attribute types as placeholders for the top-level signal names. Example pseudocode of enable criteria using such placeholders may be shown as:

when ((enable condition is true) & (input clock has a rising edge)), and example pseudocode of enable behavior sequence may include:

evaluate whether output clock is equal to input clock.

CGF checker logic 206 is configured to identify or parse out each attribute name declared in the CGF module that is associated with an attribute type included in the initial version of the enable property assertion, and to identify or parse out the top-level signal name in the top CGF mapping that is associated with the (parsed) attribute name. CGF checker logic 206 then replaces the attribute type in the initial version of the enable property assertion with its associated top-level signal name to produce the final version of the enable property assertion. In this manner, the enable condition type would be replaced with the top-level enable condition signal name and the input clock type would be replaced with the top-level ungated clock signal name, where the resulting enable criteria is shown as:

((CLK1_ENABLE==1) && $ROSE(UNGATED_CLK1)).

CGF checker logic 206 may also use information known about the test environment in which the IC design 104 is tested to generate information in the property assertions. As noted above, the clock gating circuit 404 represented by the CGF module CG_MODULEA is clocked using a sample clock, named SAMPLE_CLK, during testing. In some embodiments of the enable criteria, CGF checker logic 206 further includes a timing requirement that indicates the enable criteria should be evaluated at the transition edge of the sample clock, in order to accurately represent behavior of the gated clock signal output by the clock gating circuit 404 (which may include a flip flop or other circuitry clocked by the sample clock). Such an embodiment of the enable criteria is shown as:

@(POSEDGE SAMPLE_CLK) ((CLK1_ENABLE==1) && $ROSE(UNGATED_CLK1)).

Similarly in the behavior sequence, the output clock type would be replaced with the top-level gated clock signal name and the input clock type would be replaced with the top-level ungated clock signal name, where the resulting behavior sequence is shown as:

GATED_CLK1==UNGATED_CLK1.

In embodiments that include an on-cycle time, CGF checker logic 206 further includes a timing requirement that indicates the behavior sequence is evaluated at a time after enable criteria is satisfied, where the time is specified by the on-cycle time (e.g., an N number of clock cycles, such as two clock cycles). Such an embodiment of the behavior sequence is shown as:

2 GATED_CLK1==UNGATED_CLK1.

A disable property assertion includes disable criteria that indicates the output clock is gated or stopped based on, at least in part, a second state of the enable condition (e.g., a cleared state, such as logic level zero), and a behavior sequence that describes the target behavior of the output clock (GATED_CLK1) that is expected during testing of the IC design. Similarly, in some embodiments, a structure of the disable property assertion may be defined as:

(Disable Criteria)|→(Behavior Sequence), where the |→ symbol indicates the behavior sequence is evaluated in response to the disable criteria being satisfied.

An initial version of the disable property assertion may also use the attribute types as placeholders for the top-level signal names. Example pseudocode of disable criteria using such placeholders may be shown as:

when ((enable condition is false) & (input clock has a rising edge)), and example pseudocode of disable behavior sequence may include:

evaluate whether output clock is stopped.

As noted above, CGF checker logic 206 is configured to identify or parse out each attribute name declared in the CGF module that is associated with an attribute type included in the initial version of the disable property assertion, and to identify or parse out the top-level signal name in the top CGF mapping that is associated with the (parsed) attribute name. CGF checker logic 206 then replaces each attribute type in the initial version of the disable property assertion with its associated top-level signal name to produce the final version of the disable property assertion. In this manner, the enable condition type would be replaced with the top-level enable condition signal name and the input clock type would be replaced with the top-level ungated clock signal name, where the resulting disable criteria is shown as:

((CLK1_ENABLE===0) && $ROSE(UNGATED_CLK1)).

In some embodiments of the disable criteria, a timing requirement may be included that indicates the disable criteria should be evaluated at the transition edge of the sample clock, which is shown as:

@(POSEDGE SAMPLE_CLK) ((CLK1_ENABLE===0) && $ROSE(UNGATED_CLK1)).

Similarly in the behavior sequence, the output clock type would be replaced with the top-level gated clock signal name, where the resulting behavior sequence is shown as:

GATED_CLK1===0.

In embodiments that include an off-cycle time, CGF checker logic 206 further includes a timing requirement that indicates the behavior sequence is evaluated at a time after disable criteria is satisfied, where the time is specified by the off-cycle time (e.g., an N number of clock cycles, such as two clock cycles). Such an embodiment of the behavior sequence is shown as:

2 GATED_CLK1===0.

FIG. 8 also shows a pair of property assertion checks (also referred to as simply assertion checks) that are generated for the pair of property assertions, which together are considered a CG checker. A first assertion check is named FIRST_CHECK, which checks the enable property assertion during testing, and a second assertion check is named SECOND_CHECK, which checks the disable property assertion during testing. As noted above, the first and second assertion checks will verify whether the enable and disable property assertions hold true during testing (either by dynamic simulation or by formal verification).

Figure 7:
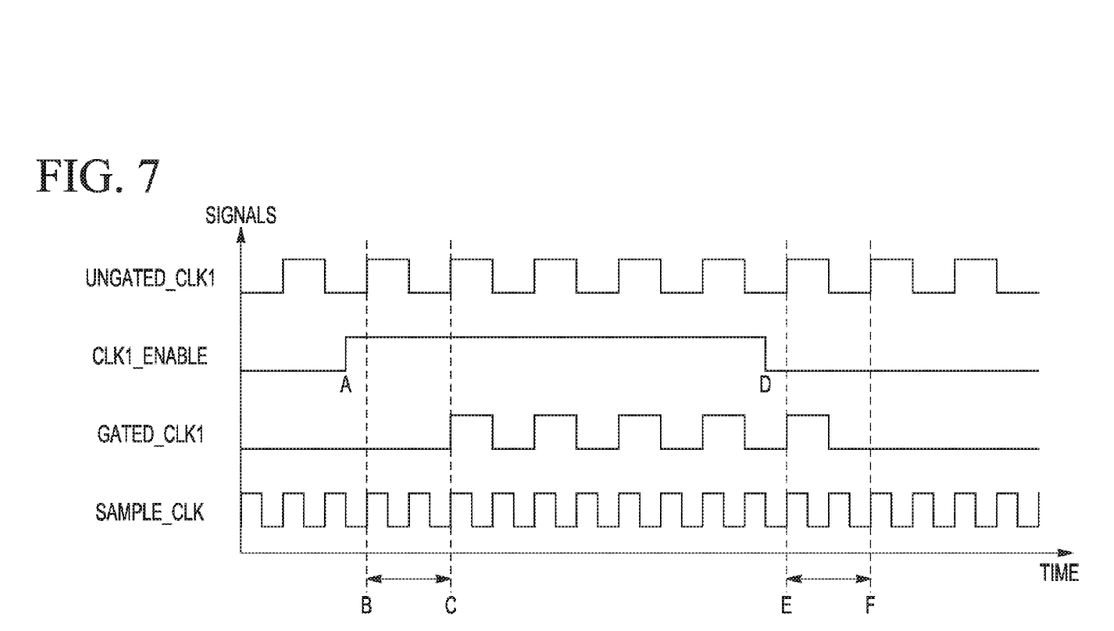
FIG. 7 illustrates example clock signal waveforms generated during clock gating verification of an integrated circuit design that implements the soft IP module, according to some embodiments.

FIG. 7 illustrates example clock signal waveforms generated during clock gating verification of an integrated circuit design that implements the soft IP module. The top-level signals UNGATED_CLK1 (input clock), CLK1_ENABLE (enable condition), and GATED_CLK1 (output clock), as well as the testing environment SAMPLE_CLK (sample clock) are shown over time. FIG. 7 is discussed in reference to the property assertions of FIG. 8.

At a time A, CLK1_ENABLE is activated, which satisfies the expression CLK1_ENABLE===1 of the enable property assertion. However, the enable property assertion is not evaluated until time B at the positive or rising edge of the sample clock. At time B, the CG checker evaluates whether the enable criteria is satisfied. Since a rising edge of UNGATED_CLK1 occurs at time B and CLK1_ENABLE is still activated at time B, the enable criteria is satisfied at time B. The CG checker then evaluates whether the behavior sequence is satisfied. However, since the enable property assertion includes a timing requirement of ##2, the CG checker waits two clock cycles of sample clock before evaluating the behavior sequence at time C. GATED_CLK1 is verified at time C when the CG checker confirms that GATED_CLK1 is equal to UNGATED_CLK1, where both clock signals are on a rising edge. The CG checker continues to evaluate the enable criteria at each positive or rising edge of sample clock, and confirms that the tested behavior of GATED_CLK1 matches the target behavior defined in CGF data. If at any point GATED_CLK1 deviated from the target behavior, the CG checker would indicate a failure.

At a time D, CLK1_ENABLE is cleared, which satisfies the expressions CLK1_ENABLE===0 of the disable property assertion. However, the disable property assertion is not evaluated until time E at the positive or rising edge of the sample clock. At time E, the CG checker evaluates whether the disable criteria is satisfied. Since a rising edge of UNGATED_CLK1 occurs at time E and CLK1_ENABLE is still cleared at time E, the disable criteria is satisfied at time E. The CG checker then evaluates whether the behavior sequence is satisfied. However, since the disable property assertion includes a timing requirement of ##2, the CG checker waits two clock cycles of sample clock before evaluating the behavior sequence at time F. GATED_CLK1 is verified at time F when the CG checker confirms that GATED_CLK1 is equal to zero or ground. The CG checker continues to evaluate the disable criteria at each positive or rising edge of sample clock, and confirms that the tested behavior of GATED_CLK1 matches the target behavior defined in CGF data. If at any point GATED_CLK1 deviated from the target behavior, the CG checker would indicate a failure.

Figure 9:
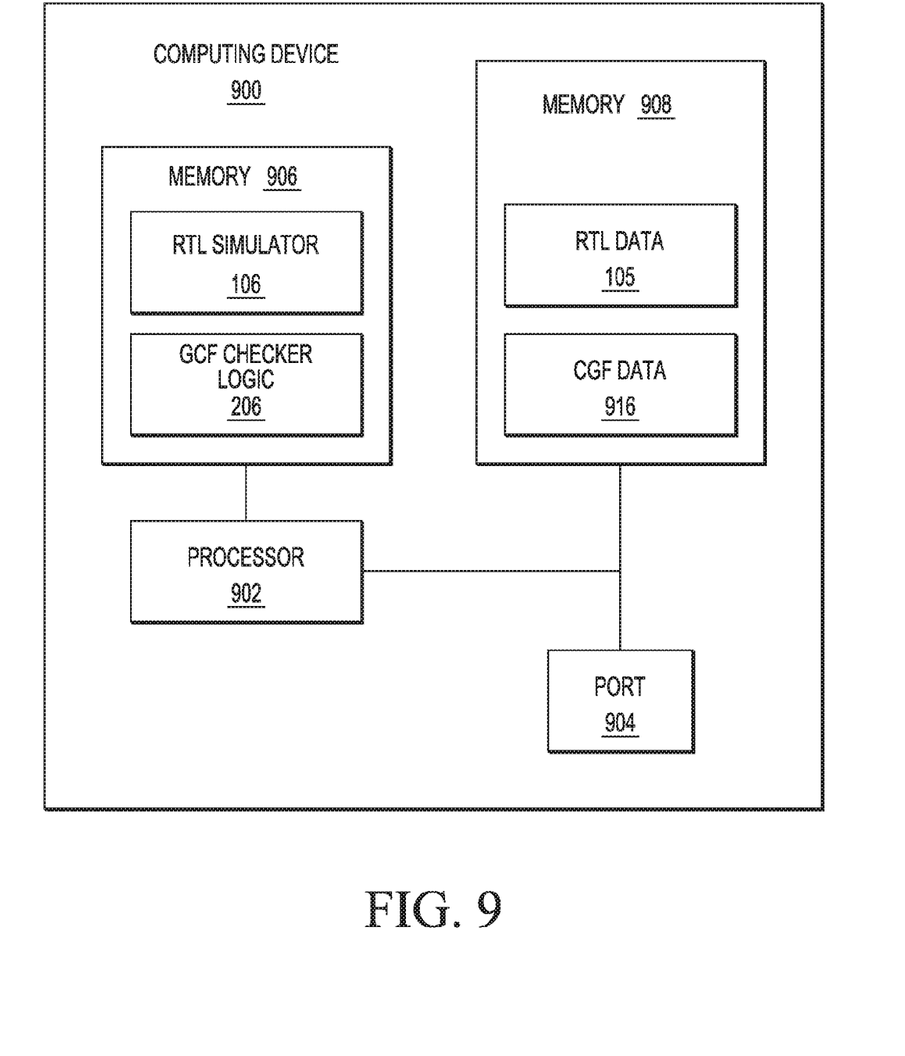
FIG. 9 is a block diagram illustrating relevant components of an example computing device in which the present disclosure can be implemented, according to one embodiment.

FIG. 9 illustrates a block diagram depicting relevant components of an example computing device 900, illustrating how CGF checker logic module 206 can be implemented in software. A computing device 900 includes at least one processing unit, associated memory, and a number of input/output (I/O) devices. Computing device 900 processes information according to a program and produces resultant output information via I/O devices. A program is a list of instructions such as a particular application program and/or an operating system. A computer program is typically stored internally on computer readable storage medium or transmitted to the computing device 900 via a computer readable transmission medium. A computer process typically includes an executing (running) program or portion of a program, current program values and state information (also simply referred to as data), and the resources used by the operating system to manage the execution of the process. Examples of computing device 900 include a mainframe, a server, a workstation, a personal computer, a minicomputer, and the like.

As illustrated, computing device 900 includes one or more processors 902 (e.g., microprocessors, PLDs (Programmable Logic Devices), or ASICs (Application Specific Integrated Circuits)) configured to execute program instructions stored in memories 906 and/or 908. Memories 906 and 908 can include various types of RAM (Random Access Memory), ROM (Read Only Memory), non-volatile memory like FLASH memory, volatile memory, and the like. Computing device 900 also includes one or more ports 904 (e.g., one or more hardware ports or other network interfaces that can be linked to other network devices, hosts, servers, storage devices, or the like). Processor 902, port 904, and memories 906 and 908 are coupled to send and receive data and control signals by one or more buses or other interconnects.

In this example, program instructions executable to implement RTL simulator 910 and CGF checker logic 206 are stored in memory 906. CGF checker logic 206 includes the functionality needed to automatically generate one or more CG checkers based on CGF data, and provide the CG checkers to RTL simulator 106 or a separate property checker tool. RTL data 105 (which includes soft IP 102 and IC design 104) can be stored in memory 908, along with CGF data 916 (which includes CG modules 202 and top CG mapping 204), both of which may be generated as part of an IC design flow like that shown in FIG. 2. These data can be stored in memory 908 prior to being sent on a network via port 904 and/or in response to being received from a network via port 904. For example, computing device 900 may be coupled to receive RTL data 105 or CGF data from design equipment by a wired or wireless network connection via port 904.

The program instructions and/or data executable to implement CGF checker logic 206 can be stored on various computer readable storage media such as a memory (e.g., RAM (Random Access Memory)) or other media on other computer systems. Such computer readable media may be permanently, removably or remotely coupled to an information processing system such as computing device 900. The computer readable media may include, for example and without limitation, any number of the following: magnetic storage media including disk and tape storage media; optical storage media such as compact disk media (e.g., CD ROM, CD R, etc.) and digital versatile disk (DVD) storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few. In some embodiments, in order be executed, the instructions and/or data are loaded into memory 906 and/or 908 from another computer readable storage medium. The instructions and/or data can also be transferred to a computing device for storage in memory via a network such as the Internet or upon a carrier medium. In some embodiments, the instructions and/or data are conveyed using a carrier medium such as a network and/or a wireless link upon which signals such as electrical, electromagnetic, or digital signals.

It is also noted that in FIG. 2, the IC design may be used to fabricate an integrated circuit after the IC design has passed clock gating verification and RTL verification. One example of the IC design 104 implements a system-on-chip (SoC), which includes various components of a system as a single integrated circuit. Example components of an integrated circuit include but are not limited to: a processor, memory, logic, analog circuitry, sensor, a MEMS device, a standalone discrete device such as a resistor, inductor, capacitor, diode, power transistor, and the like. In some embodiments, the integrated circuit may include a combination of the integrated circuit component types listed above or may be another type of microelectronic device.

The integrated circuit may be implemented on a semiconductor substrate or wafer, which can be any semiconductor material or combinations of materials, such as gallium arsenide, silicon germanium, silicon-on-insulator (SOI), silicon, monocrystalline silicon, the like, and combinations of the above. The semiconductor wafer is formed using a sequence of numerous process steps, including but not limited to depositing semiconductor materials including dielectric materials and metals, such as growing, oxidizing, sputtering, and conformal depositing, etching semiconductor materials, such as using a wet etchant or a dry etchant, planarizing semiconductor materials, such as performing chemical mechanical polishing or planarization, performing photolithography for patterning, including depositing and removing photolithography masks or other photoresist materials, ion implantation, annealing, and the like.

By now it should be appreciated that there has been provided a clock gating format (CGF) that provides a template structure (also referred to as a clock gating (CG) module) and a signal map (also referred to as a top CGF mapping) to represent a clock gating (CG) specification that describes target clock gating behavior for one or more gated clock signals utilized in an IC design.

In one embodiment of the present disclosure, a method for clock gating verification during a register transfer level (RTL) circuit design stage is provided, the method includes: obtaining clock gating information defined in a clock gating (CG) specification according to a clock gating format, wherein the clock gating information describes target clock gating behavior of at least a first gated clock signal utilized by an integrated circuit design, the CG specification includes a template structure and a top mapping, the template structure defines a relationship between an output gated clock and an input clock, based on an enable condition, the top mapping includes associations between top level signals of the integrated circuit design and the template structure, and the top level signals include the first gated clock signal mapped to the output gated clock, a first ungated clock signal mapped to the input clock, and a first enable signal mapped to the enable condition; and automatically generating a first clock gating (CG) checker to verify clock gating behavior of the first gated clock signal, wherein the first CG checker is generated based on the clock gating information defined in the CG specification, and the first CG checker verifies whether the first gated clock signal is output at a first expected time and whether the first gated clock signal is gated at a second expected time during testing of the integrated circuit design.

One aspect of the above embodiment provides that the automatically generating the first CG checker includes: automatically generating an enable property based on the clock gating information defined in the CG specification, the enable property including: an enable criteria that indicates the first gated clock signal is output in response to a transition edge of the first ungated clock signal and a first state of the first enable signal, and an enable behavior sequence that indicates the first ungated clock is expected to be output as the first gated clock signal when the enable criteria is satisfied.

A further aspect of the above embodiment provides that the automatically generating the first CG checker includes: automatically generating a disable property based on the clock gating information defined in the CG specification, the disable property including: a disable criteria that indicates the first gated clock signal is gated in response to the transition edge of the first ungated clock signal and a second state of the first enable signal, and a disable behavior sequence that indicates the first gated clock signal is expected to be gated when the disable criteria is satisfied.

A still further aspect of the above embodiment provides that the transition edge of the first ungated clock signal includes a rising clock edge, the first state of the first enable signal includes an activated state, and the second state of the first enable signal includes a deactivated state.

Another still further aspect of the above embodiment provides that the automatically generating the first CG checker further includes: automatically generating an enable property assertion for the enable property, wherein the enable property assertion is configured to provide an indication on failure of the enable property assertion during testing of the integrated circuit; and automatically generating a disable property assertion for the disable property, wherein the disable property assertion is configured to provide an indication on failure of the disable property assertion during testing of the integrated circuit, wherein the first CG checker includes the enable property assertion and the disable property assertion.

Another still further aspect of the above embodiment provides that the clock gating information further includes an on-cycle time that is included in the enable behavior sequence and an off-cycle time that is included in the disable behavior sequence, the on-cycle time indicates when the first ungated clock signal is expected to be output as the first gated clock signal after the enable criteria is satisfied, and the off-cycle time indicates when the first gated clock signal is expected to be gated after the disable criteria is satisfied.

A still further aspect of the above embodiment provides that the on-cycle time includes a first number of clock cycles, and the off-cycle time includes a second number of clock cycles.

Another aspect of the above embodiment provides that the CG specification includes a second template structure that defines a second relationship between a second output gated clock and a second input clock, and a second enable condition, and the top level signals of the top mapping further includes a second gated clock signal mapped to the second output gated clock, a second ungated clock signal mapped to the second input clock, and a second enable signal mapped to the second enable condition; and the method further includes: automatically generating a second CG checker to verify clock gating behavior of the second gated clock signal, wherein the second CG checker is generated based on the clock gating information defined in the CG specification, and the second CG checker verifies whether the second gated clock signal is output at a third expected time and whether the second gated clock signal is gated at a fourth expected time during testing of the integrated circuit design.

Another aspect of the above embodiment provides that the integrated circuit design includes at least one soft Intellectual Property (IP) block that utilizes the first gated clock signal.

Another aspect of the above embodiment provides that the integrated circuit design and the first CG checker are each implemented in hardware descriptive language (HDL) code.

Another aspect of the above embodiment provides that the method further includes: implementing the first CG checker during testing of the integrated circuit design, wherein clock gating verification is successful in response to the first CG checker verifying that tested clock gating behavior of the first gated clock matches the target clock gating behavior described in the CG specification, and clock gating verification is not successful in response to the first CG checker indicating that the tested clock gating behavior of the first gated clock does not match the target clock gating behavior described in the CG specification.

In another embodiment of the present disclosure, a method for verifying clock gating behavior during a register transfer level (RTL) circuit design stage is provided, the method including: retrieving a clock gating (CG) specification that is stored in a storage device, wherein the CG specification includes a golden clock gating relationship and a signal map, the golden clock gating relationship is defined between an output clock signal and an input clock signal, based on an enable condition, the signal map includes a first gated clock signal mapped to the output clock signal, a first ungated clock signal mapped to the input clock signal, and a first enable signal mapped to the enable condition, the first gated clock signal, the first ungated clock signal, and the first enable signal are top level signals utilized in an integrated circuit design, and the CG specification describes target clock gating behavior of the first gated clock signal based on the first ungated clock signal and the first enable signal; and automatically generating a first assertion check and a second assertion check, based on the CG specification, wherein during testing of the integrated circuit design, the first assertion check verifies whether the first gated clock signal is output at a first expected time, and during testing of the integrated circuit design, the second assertion check verifies whether the first gated clock signal is gated at a second expected time.

One aspect of the above embodiment provides that the automatically generating the first assertion check and the second assertion check includes: automatically generating an enable property that includes: an enable criteria based on the first ungated clock signal and a first state of the first enable signal, and an enable behavior sequence that indicates the first expected time at which the first ungated clock signal is expected to be output as the first gated clock signal.

A further aspect of the above embodiment provides that the automatically generating the first assertion check and the second assertion check includes: automatically generating a disable property that includes: a disable criteria based on the first ungated clock signal and a second state of the first enable signal, and a disable behavior sequence that indicates the second expected time at which the first gated clock signal is expected to be gated.

A still further aspect of the above embodiment provides that the golden clock gating relationship further includes an on-cycle time that is included in the enable behavior sequence and an off-cycle time that is included in the disable behavior sequence, the on-cycle time indicates the first expected time occurs after the enable criteria is satisfied by a first number of clock cycles, and the off-cycle time indicates the second expected time occurs after the disable criteria is satisfied by a second number of clock cycles.

Another aspect of the above embodiment provides that the method further includes: implementing the first and second assertion checks during testing of the integrated circuit design, wherein clock gating verification fails in response to one or more of the first and second assertion checks indicating that tested clock gating behavior of the first gated clock does not match the target clock gating behavior.

Another aspect of the above embodiment provides that the method further includes: fabricating an integrated circuit from the integrated circuit design, subsequent to the first gated clock signal being verified during the testing of the integrated circuit design.

In another embodiment of the present disclosure, a non-transitory computer readable storage medium is provided, which is configured to store program instructions that, when executed on a processor, are configured to implement: clock gating (CG) checker logic configured to communicate with a simulator, the simulator configured to simulate a register transfer level (RTL) integrated circuit design in a test environment using hardware descriptive language (HDL) code, the CG checker logic configured to: access a clock gating (CG) specification that is stored in a storage device, the CG specification including a golden clock gating representation and a signal map, wherein the CG specification describes target clock gating behavior of at least one gated clock signal utilized in the RTL integrated circuit design; identify an input clock signal, an output gated clock signal, and an enable condition defined in the golden clock gating representation; identify a first ungated clock signal mapped to the input clock signal, a first gated clock signal mapped to the output gated clock signal, and an first enable signal mapped to the enable condition, as defined in the signal map;

and automatically generate a first assertion check and a second assertion check, based on the golden clock representation and the signal map, wherein during testing of the integrated circuit design, the first assertion check verifies whether the first gated clock signal is output at a first expected time, and during testing of the integrated circuit design, the second assertion check verifies whether the first gated clock signal is gated at a second expected time.

One aspect of the above embodiment provides that the CG checker logic is further configured to: provide the first assertion check and the second assertion check to the simulator.

Another aspect of the above embodiment provides that the first and second assertion checks are implemented during testing of the integrated circuit design, and the testing includes at least one of formal verification and dynamic simulation.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

As used herein, the terms "substantial" and "substantially" mean sufficient to achieve the stated purpose or value in a practical manner, taking into account any minor imperfections or deviations, if any, that arise from usual and expected process abnormalities that may occur during wafer fabrication, which are not significant for the stated purpose or value.

Although the invention is described herein with reference to specific embodiments, various modifications and changes can be made without departing from the scope of the present invention as set forth in the claims below. For example, multiple RTL files and CGF files may be defined in the RTL data and CGF data of FIG. 9. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for a clock gating verification during a register transfer level (RTL) circuit design stage, the method comprising:
    obtaining clock gating information defined in a clock gating (CG) specification according to a clock gating format, wherein
        the clock gating information describes a target clock gating behavior of at least a first gated clock signal utilized by an integrated circuit design,
        the CG specification comprises a template structure and a top mapping,
        the template structure defines a relationship between an output gated clock and an input clock, based on an enable condition,
        the top mapping comprises associations between top level signals of the integrated circuit design and the template structure, and
        the top level signals comprise the first gated clock signal mapped to the output gated clock, a first ungated clock signal mapped to the input clock, and a first enable signal mapped to the enable condition; and
    automatically generating a first clock gating (CG) checker to verify a clock gating behavior of the first gated clock signal, wherein
        the first CG checker is generated based on the clock gating information defined in the CG specification, and
        the first CG checker verifies whether the first gated clock signal is output at a first expected time and whether the first gated clock signal is gated at a second expected time during testing of the integrated circuit design.

2. The method of claim 1, wherein the automatically generating a first CG checker comprises:
    automatically generating an enable property based on the clock gating information defined in the CG specification, the enable property comprising:
        an enable criteria that indicates the first gated clock signal is output in response to a transition edge of the first ungated clock signal and a first state of the first enable signal, and
        an enable behavior sequence that indicates the first ungated clock signal is expected to be output as the first gated clock signal when the enable criteria is satisfied.

3. The method of claim 2, wherein the automatically generating a first CG checker further comprises:
    automatically generating a disable property based on the clock gating information defined in the CG specification, the disable property comprising:
        a disable criteria that indicates the first gated clock signal is gated in response to the transition edge of the first ungated clock signal and a second state of the first enable signal, and
        a disable behavior sequence that indicates the first gated clock signal is expected to be gated when the disable criteria is satisfied.

4. The method of claim 3, wherein the transition edge of the first ungated clock signal comprises a rising clock edge, the first state of the first enable signal comprises an activated state, and the second state of the first enable signal comprises a deactivated state.

5. The method of claim 3, wherein the automatically generating a first CG checker further comprises:
    automatically generating an enable property assertion for the enable property, wherein the enable property assertion is configured to provide an indication on a failure of the enable property assertion during testing of the integrated circuit design; and
automatically generating a disable property assertion for the disable property, wherein
the disable property assertion is configured to provide an indication on a failure of the disable property assertion during testing of the integrated circuit design, wherein
the first CG checker comprises the enable property assertion and the disable property assertion.

6. The method of claim 3, wherein
the clock gating information further comprises an on-cycle time that is included in the enable behavior sequence and an off-cycle time that is included in the disable behavior sequence,
the on-cycle time indicates when the first ungated clock signal is expected to be output as the first gated clock signal after the enable criteria is satisfied, and
the off-cycle time indicates when the first gated clock signal is expected to be gated after the disable criteria is satisfied.

7. The method of claim 6, wherein the on-cycle time comprises a first number of clock cycles, and the off-cycle time comprises a second number of clock cycles.

8. The method of claim 1, wherein
the CG specification comprises a second template structure that defines a second relationship between a second output gated clock and a second input clock, and a second enable condition, and
the top level signals of the top mapping further comprise a second gated clock signal mapped to the second output gated clock, a second ungated clock signal mapped to the second input clock, and a second enable signal mapped to the second enable condition; and
the method further comprises:
automatically generating a second CG checker to verify clock gating behavior of the second gated clock signal, wherein
the second CG checker is generated based on the clock gating information defined in the CG specification, and
the second CG checker verifies whether the second gated clock signal is output at a third expected time and whether the second gated clock signal is gated at a fourth expected time during testing of the integrated circuit design.

9. The method of claim 1, wherein the integrated circuit design comprises at least one soft Intellectual Property (IP) block that utilizes the first gated clock signal.

10. The method of claim 1, wherein the integrated circuit design and the first CG checker are each implemented in hardware descriptive language (HDL) code.

11. The method of claim 1, further comprising:
implementing the first CG checker during testing of the integrated circuit design, wherein
the clock gating verification is successful in response to the first CG checker verifying that a tested clock gating behavior of the first gated clock signal matches the target clock gating behavior described in the CG specification, and
the clock gating verification is not successful in response to the first CG checker indicating that the tested clock gating behavior of the first gated clock signal does not match the target clock gating behavior described in the CG specification.

12. A method for a clock gating verification of a clock gating behavior during a register transfer level (RTL) circuit design stage, the method comprising:
retrieving a clock gating (CG) specification that is stored in a storage device, wherein
the CG specification comprises a golden clock gating relationship and a signal map,
the golden clock gating relationship is defined between an output clock signal and an input clock signal, based on an enable condition,
the signal map comprises a first gated clock signal mapped to the output clock signal, a first ungated clock signal mapped to the input clock signal, and a first enable signal mapped to the enable condition,
the first gated clock signal, the first ungated clock signal, and the first enable signal are top level signals utilized in an integrated circuit design, and
the CG specification describes a target clock gating behavior of the first gated clock signal based on the first ungated clock signal and the first enable signal; and
automatically generating a first assertion check and a second assertion check, based on the CG specification, wherein
during testing of the integrated circuit design, the first assertion check verifies whether the first gated clock signal is output at a first expected time, and
during testing of the integrated circuit design, the second assertion check verifies whether the first gated clock signal is gated at a second expected time.

13. The method of claim 12, wherein the automatically generating a first assertion check and a second assertion check comprises:
automatically generating an enable property that comprises:
an enable criteria based on the first ungated clock signal and a first state of the first enable signal, and
an enable behavior sequence that indicates the first expected time at which the first ungated clock signal is expected to be output as the first gated clock signal.

14. The method of claim 13, wherein the automatically generating a first assertion check and a second assertion check comprises:
automatically generating a disable property that comprises:
a disable criteria based on the first ungated clock signal and a second state of the first enable signal, and
a disable behavior sequence that indicates the second expected time at which the first gated clock signal is expected to be gated.

15. The method of claim 14, wherein
the golden clock gating relationship further comprises an on-cycle time that is included in the enable behavior sequence and an off-cycle time that is included in the disable behavior sequence,
the on-cycle time indicates the first expected time occurs after the enable criteria is satisfied by a first number of clock cycles, and
the off-cycle time indicates the second expected time occurs after the disable criteria is satisfied by a second number of clock cycles.

16. The method of claim 12, further comprising:
implementing the first assertion check and the second assertion check during testing of the integrated circuit design, wherein the clock gating verification fails in response to one or more of the first assertion check and the second assertion check indicating that a tested clock gating behavior of the first gated clock signal does not match the target clock gating behavior.

17. The method of claim 12, further comprising:
fabricating an integrated circuit from the integrated circuit design, subsequent to the first gated clock signal being verified during the testing of the integrated circuit design.

18. A non-transitory computer readable storage medium configured to store program instructions that, when executed on a processor, cause the processor to implement:
clock gating (CG) checker logic configured to communicate with a simulator, the simulator configured to simulate a register transfer level (RTL) integrated circuit design in a test environment using hardware descriptive language (HDL) code, the CG checker logic configured to:
access a clock gating (CG) specification that is stored in a storage device, the CG specification comprising a golden clock gating representation and a signal map, wherein
the CG specification describes a target clock gating behavior of at least one gated clock signal utilized in the RTL integrated circuit design;
identify an input clock signal, an output gated clock signal, and an enable condition defined in the golden clock gating representation;
identify a first ungated clock signal mapped to the input clock signal, a first gated clock signal mapped to the output gated clock signal, and a first enable signal mapped to the enable condition, as defined in the signal map; and
automatically generate a first assertion check and a second assertion check, based on the golden clock gating representation and the signal map, wherein
during testing of the integrated circuit design, the first assertion check verifies whether the first gated clock signal is output at a first expected time, and
during testing of the integrated circuit design, the second assertion check verifies whether the first gated clock signal is gated at a second expected time.

19. The computer readable storage medium of claim 18, wherein the CG checker logic is further configured to:
provide the first assertion check and the second assertion check to the simulator.

20. The computer readable storage medium of claim 18, wherein
the first and second assertion checks are implemented during testing of the integrated circuit design, and
the testing comprises at least one of a formal verification and a dynamic simulation.

* * * * *